United States Patent
Spiegel et al.

[11] Patent Number: 6,082,781
[45] Date of Patent: Jul. 4, 2000

[54] PIPE CONNECTING DEVICE

[75] Inventors: Herbert Spiegel, Niederwerrn; Robert Boehm, Schonungen, both of Germany

[73] Assignee: Hage Fittings GmbH & Co. KG, Rodgau, Germany

[21] Appl. No.: 09/117,147
[22] PCT Filed: Jan. 21, 1997
[86] PCT No.: PCT/DE97/00108
§ 371 Date: Jul. 24, 1998
§ 102(e) Date: Jul. 24, 1998
[87] PCT Pub. No.: WO97/27417
PCT Pub. Date: Jul. 31, 1997

[30] Foreign Application Priority Data

Jan. 24, 1996 [DE] Germany ............ 196 02 377

[51] Int. Cl.⁷ .............. F16L 41/02; F16L 41/03; F16L 39/00
[52] U.S. Cl. ............. 285/133.11; 285/123.15; 138/116; 29/890.148; 29/890.036
[58] Field of Search .................. 138/111, 115, 138/116; 286/123.15, 123.1, 133.11; 29/890.14, 890.148, 890.036

[56] References Cited

U.S. PATENT DOCUMENTS

| | | | |
|---|---|---|---|
| 261,189 | 7/1882 | Walker | 138/116 |
| 781,644 | 2/1905 | Fairbanks | 454/43 |
| 1,445,880 | 2/1923 | Graham | 285/121.1 |
| 2,067,078 | 1/1937 | Faber | 138/116 |
| 2,068,187 | 1/1937 | Lewis | 285/123.15 |
| 2,723,880 | 11/1955 | Danel | 138/116 |
| 3,307,205 | 3/1967 | Moeschler . | |
| 5,449,203 | 9/1995 | Sharp | 285/123.15 |
| 5,452,922 | 9/1995 | Ziu | 285/123.15 |
| 5,586,720 | 12/1996 | Spiegel et al. | 137/339 |

FOREIGN PATENT DOCUMENTS

| | | | |
|---|---|---|---|
| 534 832 | 7/1955 | Belgium . | |
| 674 137 | 9/1995 | European Pat. Off. . | |
| 2 293 652 | 7/1976 | France . | |
| 35 42 374 | 5/1987 | Germany . | |
| 3634104 | 4/1988 | Germany | 285/FOR 113 |
| 39 08 699 | 9/1990 | Germany . | |
| 40-4145290 | 5/1992 | Japan | 285/FOR 113 |

*Primary Examiner*—Eric K. Nicholson
*Attorney, Agent, or Firm*—Foley & Lardner

[57] ABSTRACT

A pipe connector for connecting at least three pipelines has a main pipe that is continuous in a direction of flow of water. A connection piece branches off from the main pipe, and an inner pipe follows both the main pipe and the connection piece. The inner pipe bears against the inner wall of main pipe and the connection piece such that the inner pipe is positioned on the extreme right portion or on the extreme left portion of the main pipe and the connection piece, with regard to the direction of the flow of water.

8 Claims, 7 Drawing Sheets

PIPE CONNECTING DEVICE

FIELD OF THE INVENTION

The invention relates to a pipe connector for connecting at least three pipelines, in particular water pipes with a pipe arranged inside them, preferably bearing against the inner wall, which connector comprises a main pipe, which is continuous in the direction of flow, and at least one connection piece, which is designed so that it branches off from the main pipe, an inner pipe, which follows the main pipe and the branch, being provided. A pipe connector of this type is also called a fitting in general speech.

BACKGROUND OF THE INVENTION

Pipelines with an internal pipe are used, for example, if a hot-water system in which the water can circulate inside the feed line is to be installed in a home or business premises, in order to have hot water available as quickly as possible after turning on the tap. Such a system is disclosed, for example, in EP 0 674 137 A1. This publication describes a hot-water supply installation with a hot-water ring main which runs through a water heater and in which the water circulates in circulation lines of substantially smaller cross section.

The circulation line may be made of flexible material, i.e. in the most simple case may be a plastic hose which has been pushed into the water pipe, or may bear fixedly against or be attached to the inner wall of the outer pipeline.

A similar system is disclosed in DE 35 42 374 A1. In this system, T-pieces, by means of which not only the outer pipes but also the inner pipes can be connected to one another, are used as the pipe connectors. The connection takes place in each case via muffs, by which the pipelines, which are attached to the pipe connector in the direction of flow of the fluid, are inserted via the muffs. The circulation lines are connected in the fitting by adhesive bonding or shrink fitting. For this purpose, a T-piece is also provided in the interior, which T-piece is branched in the same way as the outer profile of the pipe and is attached, via a web, in the branch connection piece. Absolutely rigid fixing of the inner T-piece is impossible, since further webs would considerably restrict the pipe cross section in the fitting. Connecting the circulation line to the inner T-piece is therefore extremely complicated, in particular because the inner T-piece does not assume a defined position inside the fitting. It is therefore also consciously accepted that the connection location will not be absolutely leaktight in the interior. Although water losses at the connection location play only a subordinate role, since the water is returned, nevertheless heated water is "lost", so that the efficiency of the system is reduced. Moreover, owing to the complicated form of attachment, assembly time is extremely high.

SUMMARY OF THE INVENTION

On the basis of these problems, one of the objectives of the present invention is to develop a pipe connector in such a way that simple assembly of the water supply system is possible and leaktight connection of the inner circulation line can be produced.

In order to solve this problem, the pipe connector explained at the outset is distinguished by the fact that the inner pipe bears against the inner wall in such a way that it is situated on the extreme right or on the extreme left with regard to the direction of flow and as seen in plan view of the connection piece.

This design provides a defined connection option for the circulation line in the pipe connector. Owing to the attachment to the inner wall, the connection piece for the circulation line is rigid, so that secure and leakproof connection can be achieved.

Preferably, the inner pipe is set back toward the inside at the connection locations. This is advantageous in particular when the pipeline which is to be connected has a flexible circulation line which is guided out of the pipeline at its ends and can then be guided onto the pipe connector. In this case, it is irrelevant how and whether the circulation line is connected to the pipeline. If the latter is also attached to the inner wall, the attachment must be designed in such a way that it can be separated at the connection location, in order, for example, to move the line from the extreme right to the extreme left, or vice versa.

If a plurality of branch connection pieces, which lead in different directions, are provided, it is also possible to carry out different connections and multiple branchings inside a system of pipelines. Consequently, in addition to a T-connector, a cross connector, in particular, is also conceivable.

Preferably, the inner pipe is welded or soldered to the inner wall of the pipe connector.

In order to form the inner pipe, a web, which is arranged eccentrically and is connected at both its ends to the inner wall, may be provided, so that the pipe connector is divided into two chambers.

The pipe connector is particularly simple to produce if the inner pipe is formed by boring open a bead which is cast integrally on the inner wall. Then, to produce the inner branch connection piece, in the case of a T-piece or cross connector, all that is required are two bores which are formed perpendicular to one another and run parallel to the outer wall. The size of the pipe cross section is determined by the width of the integrally cast bead.

To reduce the wall thickness and to form stops both for the connection of the outer pipeline and of the inner pipeline, the ends are preferably wider on the inside at the connection locations in the pipe connector.

BRIEF DESCRIPTION OF THE DRAWINGS

Exemplary embodiments of the invention are to be explained in more detail below with reference to the drawings, in which:

FIG. 1b shows a plan view of a pipe connector as seen in the direction of arrow I in accordance with FIG. 1a;

FIG. 1c shows a view of the pipe connector in the direction of arrow II in accordance with FIG. 1a;

FIG. 2a shows a longitudinal section through the pipe connector in accordance with FIG. 1a;

FIG. 2b shows a plan view of the pipe connector as seen in the direction of arrow P in accordance with FIG. 2a;

FIG. 3b shows a plan view of the T-piece as seen in the direction of arrow VII in accordance with FIG. 3a;

FIG. 3c shows a view of the T-piece as seen in the direction of arrow VIII in accordance with FIG. 3a;

FIG. 4aa shows a plan view of the pipeline in accordance with FIG. 4a;

FIG. 4bb shows a plan view of the pipeline in accordance with FIG. 4b;

FIG. 5b shows a plan view of the pipe connector as seen in the direction of arrow III in accordance with FIG. 5a;

FIG. 5c shows a view of the pipe connector as seen in the direction of arrow IV in accordance with FIG. 5a;

FIG. 6c shows a plan view of the end in accordance with FIG. 6a;

FIG. 7b shows a plan view of the pipe connector as seen in the direction of arrow V in accordance with FIG. 7a;

FIG. 7c shows a view of the pipe connector as seen in the direction of arrow VI in accordance with FIG. 7a.

DETAILED DESCRIPTION OF THE PREFERRED EMBODIMENTS

Figure 4A:
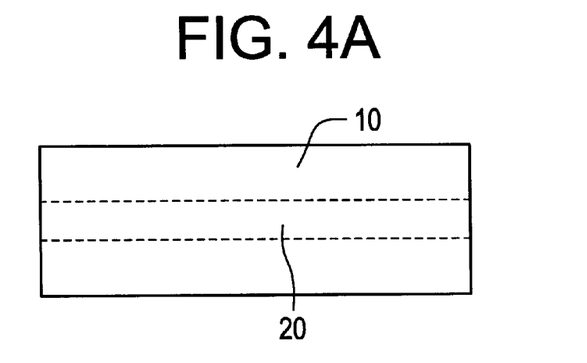
FIG. 4a shows a side view of a straight pipeline.
Figure 4B:
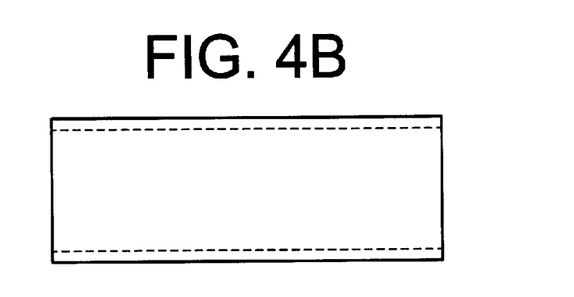
FIG. 4b shows a side view of a further exemplary embodiment of a straight pipeline.

The basic design of the pipelines which are to be connected using the pipe connector is shown by FIGS. 4a–4b–4bb.

The outer pipe 10 has a much larger cross section than the inner pipe 20, which runs eccentrically with respect to the outer pipe 10, bears against the inner wall of the outer pipe 10 and may be fixedly connected to the inner wall. The length of the pipes 10, 20 can be selected as desired, in such a way that a system of lines can be installed in a suitable manner. The inner pipe 20 may be welded or soldered to the outer pipe 10. It is also possible to produce a connection using a web (not shown in more detail here). It is also conceivable to form the inner pipe 20' by designing a web 30 in the pipe 10, as shown in FIGS. 4b and 4bb. At both its ends, this web 30 seals tightly against the outer pipe 10, so that two chambers are formed inside the pipe 10.

Figure 1A:
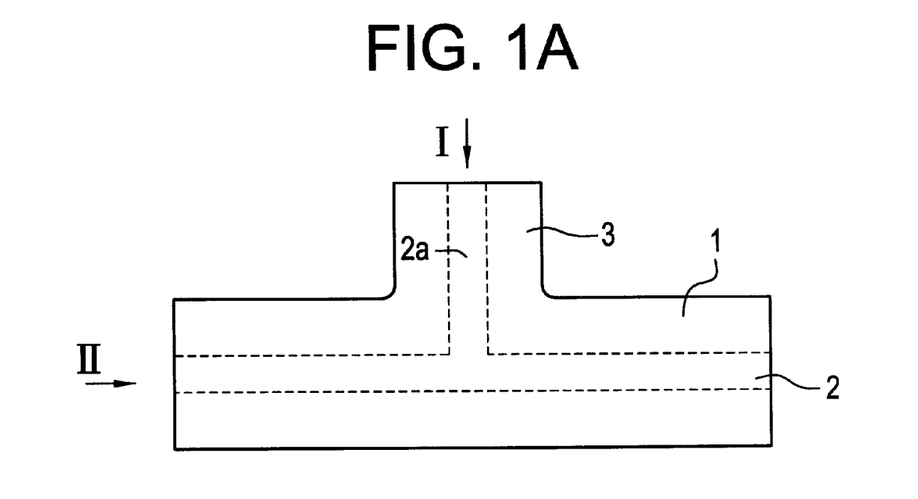
FIG. 1a shows a side view of a pipe connector designed as a T-piece.
Figure 1B:
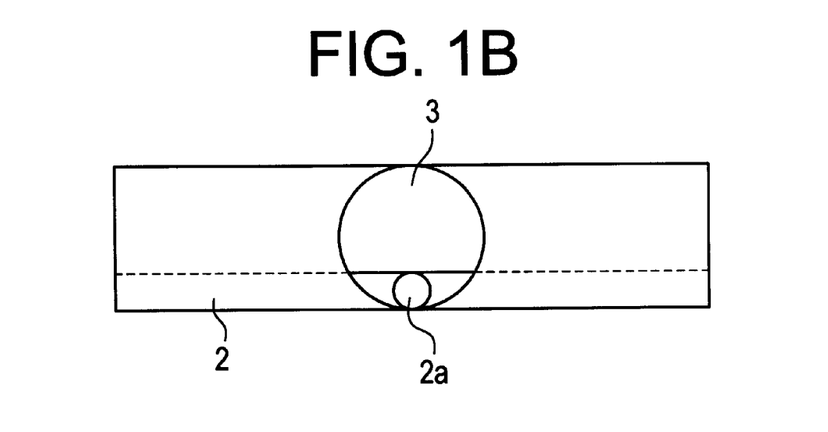
Figure 1C:
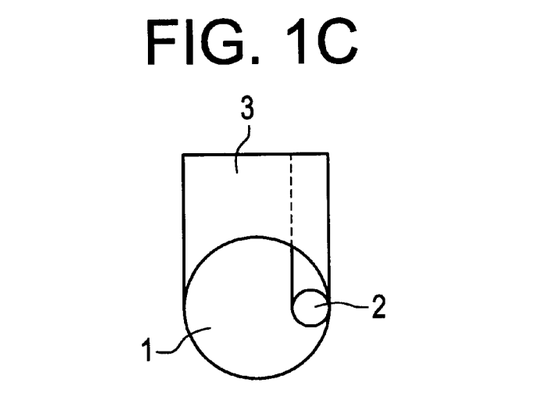
Figure 2A:
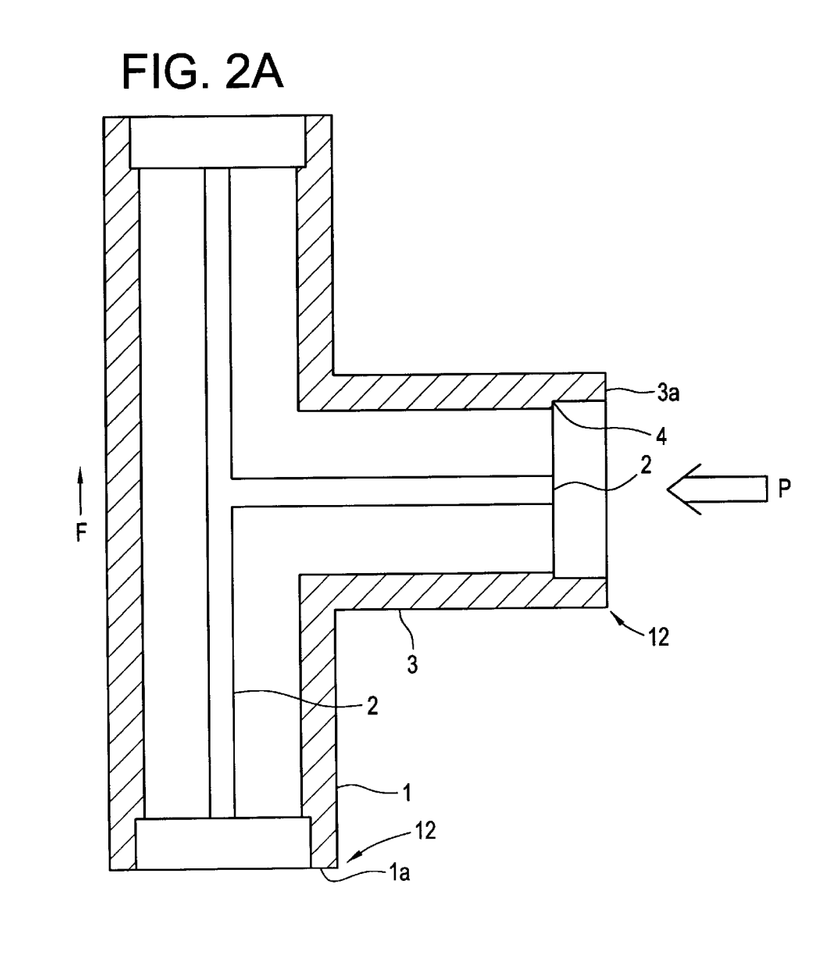
Figure 2B:
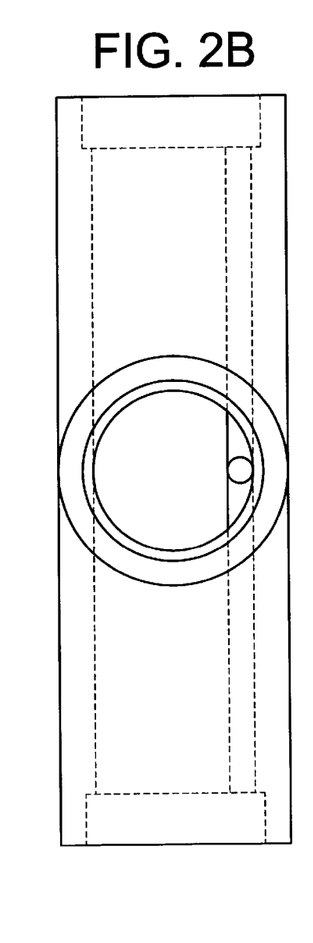
Figure 3A:
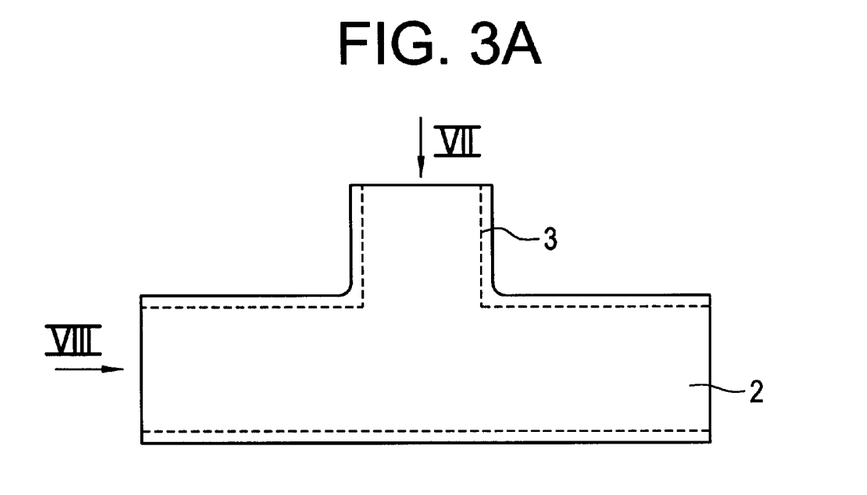
FIG. 3a shows a side view of a further exemplary embodiment.
Figure 3B:
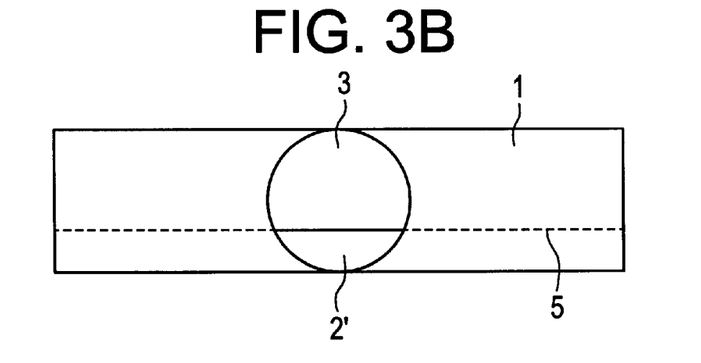
Figure 3C:
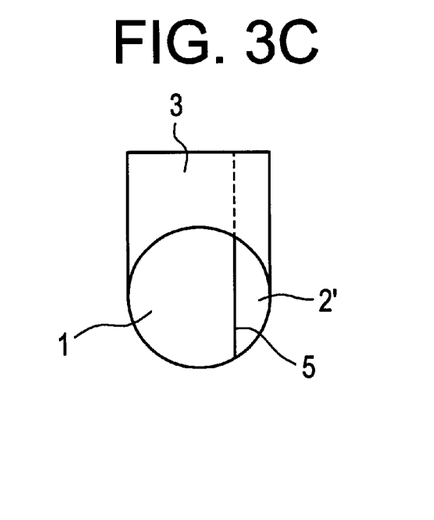

FIGS. 1 to 3 show a pipe connector which is designed as a T-piece and can be used if individual lines are to be led from a riser pipe to the taps (not shown in more detail here). The pipe connector comprises the main pipe 1, which runs in the direction of flow F, with the connection piece 3 branching off perpendicular thereto. The inner pipe 2 follows the main pipe 1 and the connection piece 3, so that an inner pipe 2a is formed in the connection piece 3.

In the main pipe 1 and in the connection piece 3, the inner pipe 2, 2a bears against the inner wall and is rigidly connected to the latter. The inner pipe 2, 2a is arranged in such a manner that it is situated on the extreme right (as shown in FIG. 2) or on the extreme left, i.e. diametrically with respect thereto, in plan view (as seen in the direction of arrow P) of the connection piece 3 and with respect to the direction of flow F.

In order to form a stop for the pipelines 10, 20, the ends of the main pipe 1 and of the connection piece 3 are wider on the inside, resulting in a reduced wall thickness 1a, 3a in this region and producing shoulders 4 against which the pipes 10, 20 can then abut. The pipes 10 can be fastened to the pipe connector in a conventional manner using a screwed clamping fit or the like.

The inner pipe 2 may also project out of the pipe connector. In this case, the ends of the pipelines 10, 20 are to be designed accordingly.

Figure 5A:
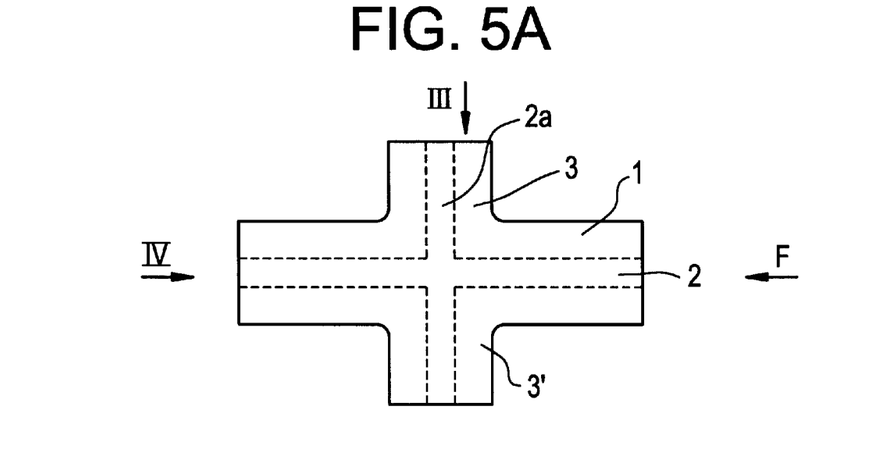
FIG. 5a shows a side view of a pipe connector which is designed as a cross fitting.
Figure 5B:
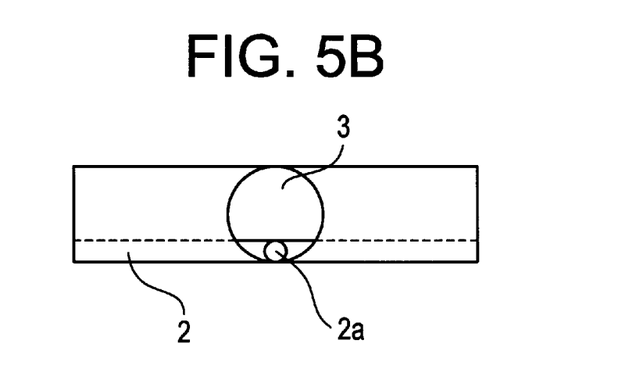
Figure 5C:
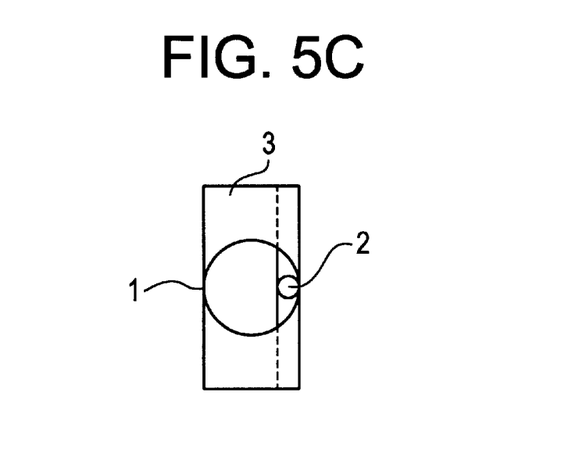
Figure 7A:
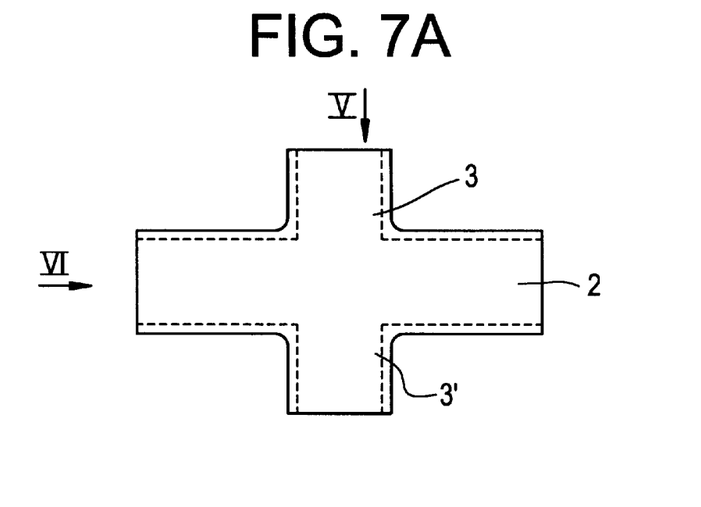
FIG. 7a shows a side view of a further pipe connector which is designed as a cross fitting.
Figure 7B:
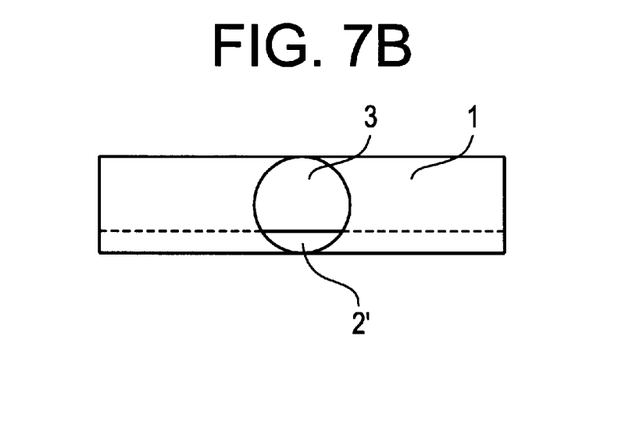
Figure 7C:
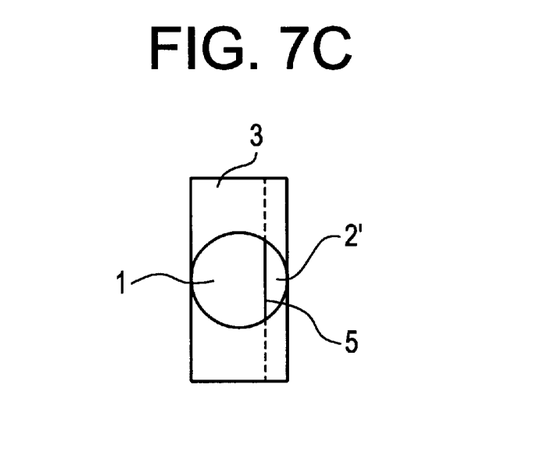

FIGS. 5 and 7 show a further exemplary embodiment of a pipe connector. In this case, the pipe connector is designed as a cross fitting and has a further connection piece 3' which lies opposite the connection piece 3.

By means of a web 5 which, as shown in FIGS. 3c or 7c, is drawn into the main pipe 1 and/or the connection piece 3 and/or 3' in such a manner that its two ends bear tightly against the inner wall, it is possible to form a chamber 2' instead of an inner pipe 2 in the pipe connector, which chamber serves as the circulation line. This design is selected when the lines which are to be connected to the pipe connector are of corresponding design (FIG. 4b).

Figure 6A:
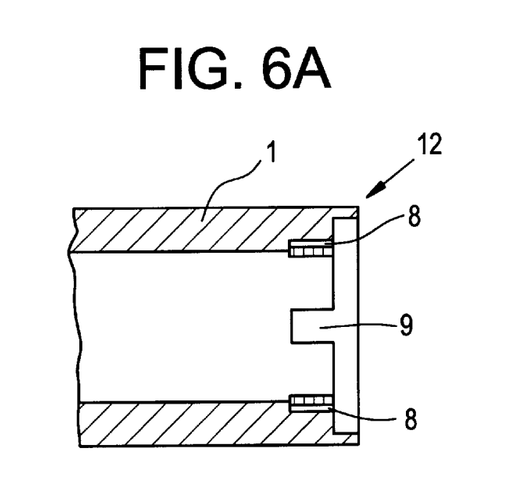
FIG. 6a shows the end piece of a fitting with a protection against twisting, in longitudinal section.
Figure 6B:
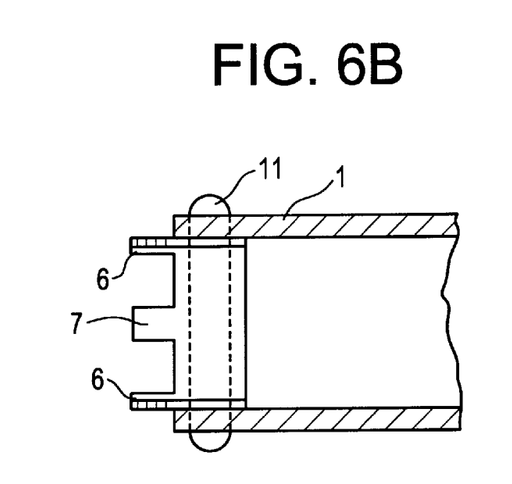
FIG. 6b shows the corresponding end of a pipe with protection against twisting.
Figure 6C:
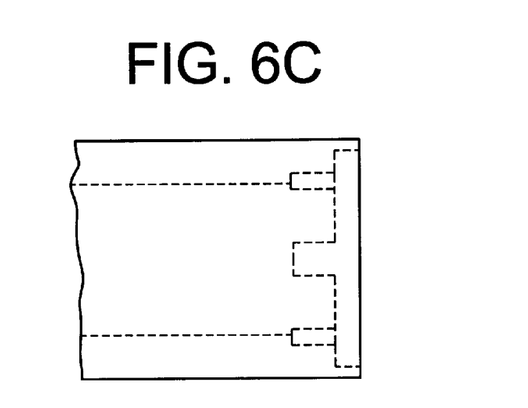
Figure 6D:
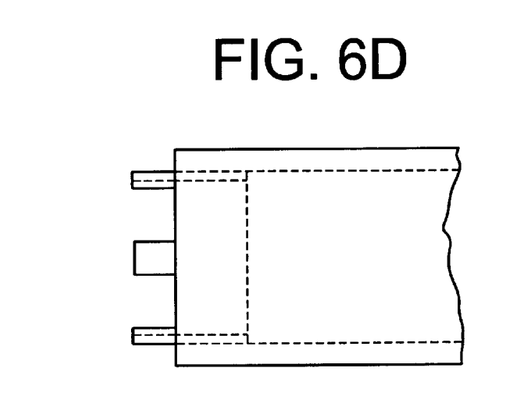
FIG. 6d shows a plan view of the pipe end in accordance with FIG. 6b.

It is possible to connect individual pipe sections in such a manner that they are secure against twisting if one pipe end is designed with lugs 6, 7 and the other with correspondingly configured grooves 8, 9 which can engage into one another. Correspondingly, the pipe connector is provided at its ends 12 with preferably a multiplicity of grooves 8, 9 which are distributed over the circumference. After the pipe with the lugs 6, 7 has been inserted into the grooves 8, 9, they are clamped together using the clamping ring 11, which is diagrammatically illustrated in FIG. 6b. The clamping connection takes place in a conventional manner, so that there is no need for this to be explained in more detail here.

What is claimed is:

1. A pipe connector for connecting at least three pipelines, in particular water pipes with a pipe arranged inside them bearing against the inner wall, the pipe connector comprising:

a main pipe that is continuous in a direction of flow (F) of water, the main pipe having an extreme right portion and an extreme left portion;

at least one connection piece that branches off from said main pipe; and an inner pipe, which follows both the main pipe and the at least one connection piece;

wherein the inner pipe bears against an inner wall of the main pipe and the at least one connection piece such that the inner pipe is positioned on the extreme right portion or on the extreme left portion of the main pipe and the at least one connection piece, with regard to the direction of flow (F).

2. The pipe connector according to claim 1, wherein the inner pipe is branched at a connection location proximate to the at least one connection piece.

3. The pipe connector according to claim 1, in that the further comprising a plurality of branch connection pieces, which lead in different directions.

4. The pipe connector according to claim 1, wherein the inner pipe is welded or soldered to the main pipe and the connection piece.

5. The pipe connector according to claim 1, wherein the inner pipe is formed by a web, which is arranged eccentrically and is connected at both its ends to the inner wall of the main pipe and connection piece.

6. The pipe connector according to claim 1, further comprising at least one internal groove for rotationally secure connection to a pipe.

7. A process for producing a pipe connector having an inner pipe arranged inside a main pipe and a branch connection piece, the process comprising the steps of:

casting a bead integrally with an inner wall of both the main pipe and the branch connection piece so that it follows both the main pipe and the branch connection piece; and boring open the bead to form the inner pipe that follows both the main pipe and the branch connection piece.

8. The process according to claim 7, further comprising the step of forming the ends of the main pipe and the branch connection piece to be wider on an inside at connection locations with external pipes, in order to reduce a wall thickness of the main pipe and the branch connection piece and to thereby form stops.

\* \* \* \* \*